US012686485B2

(12) United States Patent
Edwards et al.

(10) Patent No.: US 12,686,485 B2
(45) Date of Patent: Jul. 21, 2026

(54) COMPOSITE FUSELAGE BARREL WITH IMPROVED EME PROTECTION AND METHOD OF MAKING THEREOF

(71) Applicant: The Boeing Company, Arlington, VA (US)

(72) Inventors: Glory Christine Edwards, Edmonds, WA (US); Arne K. Lewis, Auburn, WA (US)

(73) Assignee: THE BOEING COMPANY, Arlington, VA (US)

( * ) Notice: Subject to any disclaimer, the term of this patent is extended or adjusted under 35 U.S.C. 154(b) by 169 days.

(21) Appl. No.: 18/736,267

(22) Filed: Jun. 6, 2024

(65) Prior Publication Data

US 2025/0376253 A1     Dec. 11, 2025

(51) Int. Cl.
B64C 1/12 (2006.01)
B64C 1/00 (2006.01)
B64D 45/02 (2006.01)

(52) U.S. Cl.
CPC ................ B64C 1/12 (2013.01); B64D 45/02 (2013.01); B64C 2001/0072 (2013.01)

(58) Field of Classification Search
CPC .... B64C 1/12; B64C 2001/0072; B64D 45/02
USPC ........................................................ 361/218
See application file for complete search history.

(56) References Cited

U.S. PATENT DOCUMENTS

| | | | |
|---|---|---|---|
| 4,912,594 A * | 3/1990 | Bannink, Jr. ............. | H05F 3/00 |
| | | | 244/1 A |
| 7,325,771 B2 | 2/2008 | Stulc et al. | |
| 7,410,352 B2 | 8/2008 | Sarh | |
| 8,038,099 B2 | 10/2011 | Anast et al. | |
| 8,186,614 B2 * | 5/2012 | Sanchez-Brunete ... | B64D 45/02 |
| | | | 244/1 A |
| 8,894,011 B1 | 11/2014 | Guerquin | |
| 8,939,406 B2 | 1/2015 | Dopker et al. | |
| 9,849,656 B2 | 12/2017 | Wardlaw | |
| 10,296,576 B2 | 5/2019 | Hasan | |
| 11,460,830 B2 | 10/2022 | Ridgeway et al. | |
| 2009/0269547 A1 | 10/2009 | Meyer et al. | |
| 2010/0108804 A1* | 5/2010 | Oguri ..................... | B64D 45/02 |
| | | | 244/1 A |
| 2010/0320315 A1* | 12/2010 | Kashiwagi ............ | F16B 33/004 |
| | | | 244/1 A |
| 2022/0153452 A1 | 5/2022 | Smith et al. | |
| 2022/0203919 A1* | 6/2022 | An ........................... | B32B 5/18 |

FOREIGN PATENT DOCUMENTS

WO          2015/122939 A1     8/2015

* cited by examiner

*Primary Examiner* — Michael R. Fin
(74) *Attorney, Agent, or Firm* — MH2 Technology Law Group LLP

(57)          ABSTRACT

A composite fuselage section, including an outer skin comprising one or more composite materials, an internal framework to support the outer skin, and one or more mechanical fasteners disposed through the outer skin, wherein the internal framework is joined to the outer skin using the one or more mechanical fasteners, and wherein the outer skin includes a conductive layer surrounding at least one of the one or more mechanical fasteners to enhance an energy distribution of a lightning strike flowing across a surface of the composite fuselage section.

20 Claims, 7 Drawing Sheets

200

COMPOSITE FUSELAGE BARREL WITH IMPROVED EME PROTECTION AND METHOD OF MAKING THEREOF

TECHNICAL FIELD

The present disclosure generally relates to aircraft fuselages. More particularly, the present disclosure is related to composite fuselage sections or barrel assemblies with improved electromagnetic effects (EME) protection and methods of making thereof.

BACKGROUND

An aircraft fuselage can be constructed by joining together a plurality of fuselage sections, such as cylindrical fuselage sections or barrel assemblies. The barrel assemblies can each comprise an outer skin attached to an internal framework of circumferential, i.e., barrel-shaped, frames and longitudinal stringers. Mechanical fasteners can be used to join together the fuselage sections together and/or to join the framework components to the outer skin of the fuselage sections or barrel assemblies. For example, frames and stringers can be attached to the outer composite skin using bolts, rivets, one-sided and two-sided lockbolts, screws, hex drive bolts, blind fasteners, and the like.

Aircraft experience electromagnetic effects (EME) from a variety of sources, such as lightning strikes, which may impact the aircraft fuselage and can concentrate at the joints created by the mechanical fasteners. For example, lightning currents may travel through structural joints via the mechanical fasteners and the fuselage skin in contact with the fasteners may provide the pathways for current mobility. Metallic aircraft structures are readily conductive and, thus, may be less susceptible to EME. However, composite aircraft structures (e.g., carbon fiber reinforced thermoset and thermoplastic composite structures) may have a lower conductivity than traditional aluminum or metallic structures, and poor fiber connectivity to the mechanical fasteners may inhibit current flow and increase current density. Increasing current density may give rise to ignition sources, such as heat and thermal decomposition of surrounding organics, causing hot particle ejection or arcing across poorly connected interfaces.

Accordingly, there is a need for composite fuselage sections or composite barrel assemblies with improved electromagnetic effects (EME) protection to help disperse energy from lightning strikes and mitigate potential damage to the aircraft.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities exemplified in the present disclosure may be achieved by providing a composite fuselage section, including an outer skin comprising one or more composite materials, an internal framework to support the outer skin, and one or more mechanical fasteners disposed through the outer skin, wherein the internal framework is joined to the outer skin using the one or more mechanical fasteners, and wherein the outer skin includes a conductive layer surrounding at least one of the one or more mechanical fasteners to enhance an energy distribution of a lightning strike flowing across a surface of the composite fuselage section.

Substantially all of the one or more mechanical fasteners disposed through the outer skin can be surrounded by the conductive layer.

The composite fuselage section can be configured as a forward section of an aircraft, and substantially all of the one or more mechanical fasteners disposed through the outer skin can be surrounded by the conductive layer.

The conductive layer can cover an area from about 0.5 inches to about 10 inches surrounding the at least one of the one or more mechanical fasteners.

The conductive layer can cover an area from about 0.5 inches to about 10 inches surrounding the one or more mechanical fasteners.

The outer skin can include an inner layer defining an inner surface of the outer skin; an outer layer disposed over the inner layer; and the conductive layer disposed over the outer layer, wherein the outer layer can be conductive and the outer layer can be electrically connected to the conductive layer.

The one or more mechanical fasteners can be disposed through the inner layer, the outer layer, and the conductive layer.

The outer layer can include an inter woven wire fabric (IWWF) layer comprising carbon fibers.

At least some of the carbon fibers in the outer layer can be in direct physical contact with the conductive layer.

The one or more mechanical fasteners can be countersunk through the outer layer to enhance a connection of the mechanical fasteners to the IWWF layer.

The conductive layer can include a copper or a copper alloy, and the conductive layer can have a thickness of from about 0.005 inches to about 0.020 inches.

The conductive layer can include a perforated copper foil.

The outer skin can include an adhesive layer disposed between the conductive layer and the outer layer to bond the conductive layer and the outer layer.

The conductive layer can include one or more conductive bands disposed over the outer layer, and at least one of the one or more conductive bands can define a circumferential electrical path around the outer skin.

The conductive layer can include one or more conductive bands disposed over the outer layer, and at least one of the one or more conductive bands can define a longitudinal electrical path along the outer skin.

The conductive layer can include one or more non-continuous conductive segments disposed over the outer layer.

The internal framework can include at least one of a plurality of circumferential frames and a plurality of longitudinal stringers attached to the outer skin using the one or more mechanical fasteners, and the conductive layer can be disposed to surround the one or more mechanical fasteners joining the at least one of the plurality of circumferential frames and the plurality of longitudinal stringers to the outer skin.

The outer skin can include one or more components, and the one or more components of the outer skin can be joined together using one or more mechanical fasteners, and the conductive layer can be disposed to surround the one or more mechanical fasteners joining the one or more components of the outer skin.

The foregoing and/or other aspects and utilities exemplified in the present disclosure may also be achieved by providing a composite fuselage section, including a composite outer skin, an internal framework to support the composite outer skin, and one or more mechanical fasteners to join the internal framework to the composite outer skin, wherein the composite outer skin includes a conductive layer to cover an area from about 0.5 inches to about 10 inches surrounding the one or more mechanical fasteners.

The composite outer skin can include an outer layer comprising an inter woven wire fabric (IWWF) layer, the conductive layer can be disposed over the outer layer, and the one or more mechanical fasteners can be disposed through the outer layer and the conductive layer to help disperse an energy of a lightning strike along an outer portion of the composite outer skin.

Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
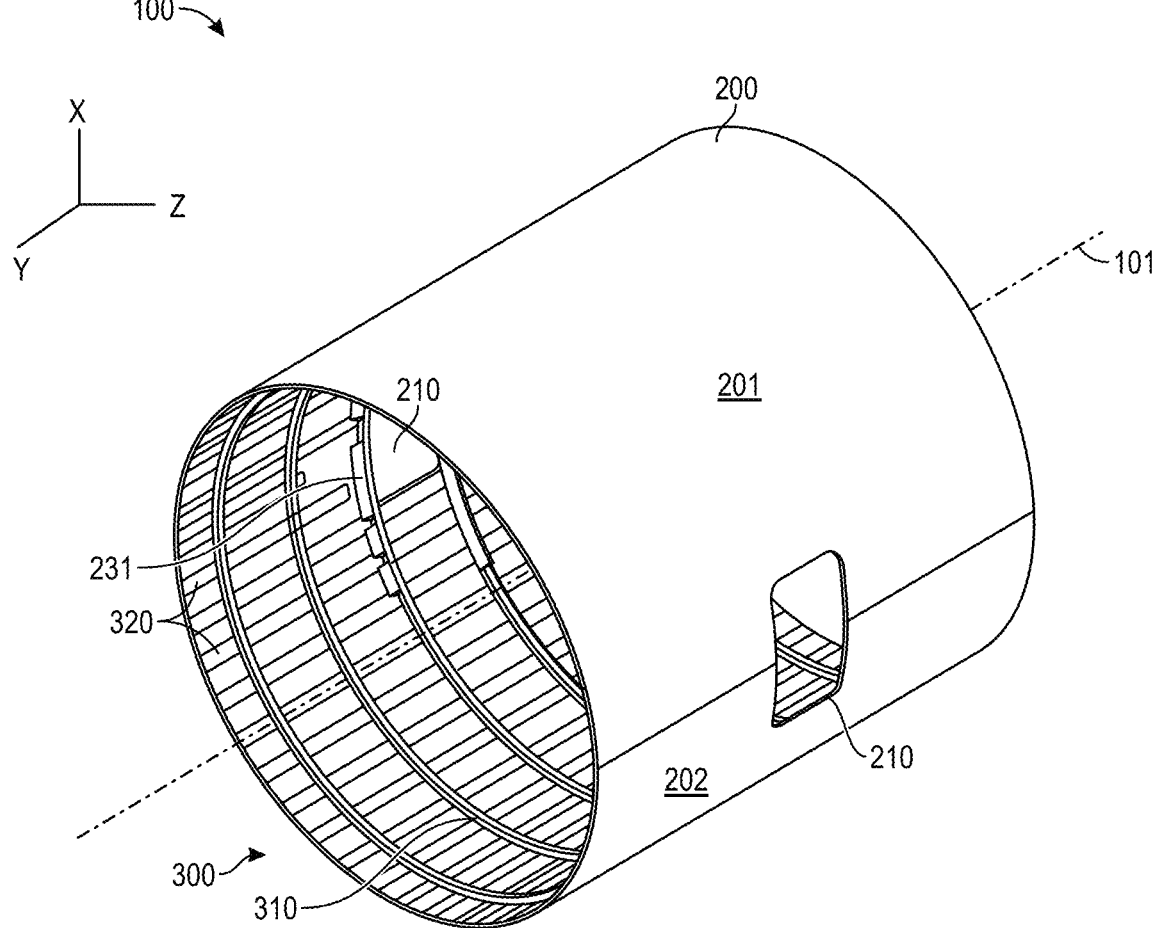
FIG. 1 illustrates a composite fuselage section according to implementations of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Throughout the specification and claims, the following terms take the meanings explicitly associated herein, unless the context clearly dictates otherwise. Phrases, such as, "in an implementation," "in certain implementations," and "in some implementations" as used herein do not necessarily refer to the same implementation(s), though they may. Furthermore, the phrases "in another implementation" and "in some other implementations" as used herein do not necessarily refer to a different implementation, although they may. As described below, various implementations can be readily combined, without departing from the scope or spirit of the present disclosure.

As used herein, the term "or" is an inclusive operator, and is equivalent to the term "and/or," unless the context clearly dictates otherwise. The term "based on" is not exclusive and allows for being based on additional factors not described unless the context clearly dictates otherwise. In the specification, the recitation of "at least one of A, B, and C," includes implementations containing A, B, or C, multiple examples of A, B, or C, or combinations of A/B, A/C, B/C, A/B/B/, B/B/C, A/B/C, etc. In addition, throughout the specification, the meaning of "a," "an," and "the" include plural references. The meaning of "in" includes "in" and "on." Similarly, implementations of the present disclosure may suitably comprise, consist of, or consist essentially of, the elements A, B, C, etc.

It will also be understood that, although the terms first, second, etc. can be used herein to describe various elements, these elements should not be limited by these terms. These terms are only used to distinguish one element from another. For example, a first object, component, or step could be termed a second object, component, or step, and, similarly, a second object, component, or step could be termed a first object, component, or step, without departing from the scope of the invention. The first object, component, or step, and the second object, component, or step, are both, objects, component, or steps, respectively, but they are not to be considered the same object, component, or step. It will be further understood that the terms "includes," "including," "comprises" and/or "comprising," when used in this specification, specify the presence of stated features, steps, operations, elements, and/or components, but do not preclude the presence or addition of one or more other features, steps, operations, elements, components, and/or groups thereof. Further, as used herein, the term "if" can be construed to mean "when" or "upon" or "in response to determining" or "in response to detecting," depending on the context.

All physical properties that are defined hereinafter are measured at 20° C. to 25° C. (68° F. to 77° F.) unless otherwise specified.

When referring to any numerical range of values herein, such ranges are understood to include each and every number and/or fraction between the stated range minimum and maximum, as well as the endpoints. For example, a range of 0.5% to 6% would expressly include all intermediate values of, for example, 0.6%, 0.7%, and 0.9%, all the way up to and including 5.95%, 5.97%, and 5.99%, among many others. The same applies to each other numerical property and/or elemental range set forth herein, unless the context clearly dictates otherwise.

Additionally, all numerical values are "about" or "approximately" the indicated value, and take into account experimental error and variations that would be expected by a person having ordinary skill in the art. It should be appreciated that all numerical values and ranges disclosed herein are approximate values and ranges. The terms "about" or "substantial" and "substantially" or "approximately," with reference to amounts or measurement values, are meant that the recited characteristic, parameter, or values need not be achieved exactly. Rather, deviations or variations, including, for example, tolerances, measurement error, measurement accuracy limitations, and other factors known to those skilled in the art, may occur in amounts that do not preclude the effect that the characteristic was intended to provide. As used herein, "about" is to mean within +/−10% of a stated target value, maximum, or minimum value.

Unless otherwise specified, all percentages and amounts expressed herein and elsewhere in the specification should be understood to refer to percentages by weight. The percentages and amounts given are based on the active weight of the material. For example, for an active ingredient provided as a solution, the amounts given are based on the amount of the active ingredient without the amount of solvent or may be determined by weight loss after evaporation of the solvent.

With regard to procedures, methods, techniques, and workflows that are in accordance with some implementations, some operations in the procedures, methods, techniques, and workflows disclosed herein can be combined and/or the order of some operations can be changed.

FIG. 1 illustrates a composite fuselage section according to implementations of the present disclosure. As illustrated in FIG. 1, a composite fuselage section 100 for an aircraft fuselage includes a longitudinal axis 101 and can include a variety of cross-sectional shapes. For example, as illustrated in FIG. 1, the composite fuselage section 100 has a circular cross-section and defines a barrel-shape composite fuselage section 100. However, the present disclosure is not limited thereto, and the composite fuselage section 100 can have other cross-sectional shapes. For example, the composite fuselage section 100 can have a half-barrel or semi-circular cross-sectional shape, or a quarter-barrel shape. In other implementations, the composite fuselage section 100 can have an oval or semi-oval cross-sectional shape. In some embodiments, the fuselage section 100 can be a composite fuselage panel.

The composite fuselage section 100 comprises an outer skin 200 and an internal framework 300. In some implementations, the outer skin 200 can comprise two or more components joined together. For example, the outer skin 200 can comprise two half-barrel outer skins (201 and 202) joined together to form the composite fuselage section 100 (see FIG. 4) or two or more composite fuselage panel.

The outer skin 200 can comprise one or more composite materials, such as, one or more laminated plies of a fiber reinforced resin. For example, the outer skin 200 can comprise one or more fiber reinforced thermoset and thermoplastic layers.

The outer skin 200 can include one or more window cutouts 210. In some implementations the outer skin 200 will be thicker or can include additional composite layers to reinforce the window cutouts 210. For example, the outer skin 200 can include doublers 231 to surround and increase the fuselage strength around the window cutouts 210. While doublers 231 are illustrated surrounding the window cutouts 210, doublers 231 can also be used to surround and reinforce other openings in the composite fuselage section 100, such as door areas.

The outer skin 200 can be attached to the internal framework 300 using fastening, bonding, adhesives, or other methods and techniques. For example, as illustrated in FIGS. 4-5, one or more mechanical fasteners 500 can be used to attach components of the internal framework 300 to the outer skin 200.

The internal framework 300 can help support the outer skin 200. For example, the internal framework 300 can include a plurality of components configured to reinforce the aircraft fuselage, reinforce the outer skin 200, and help distribute loads and dynamic forces for the composite fuselage section 100 and the aircraft in general. For example, as illustrated in FIG. 1, the internal framework 300 can include a plurality of circumferential frames 310 and a plurality of longitudinal stringers 320. The circumferential frames 310 can be spaced apart along the longitudinal axis 101 at a predetermined distance to support the outer skin 200. The longitudinal stringers 320 can be spaced apart along an internal circumference of the outer skin 200 to support and provide rigidity to the composite fuselage section 100.

Figure 4:
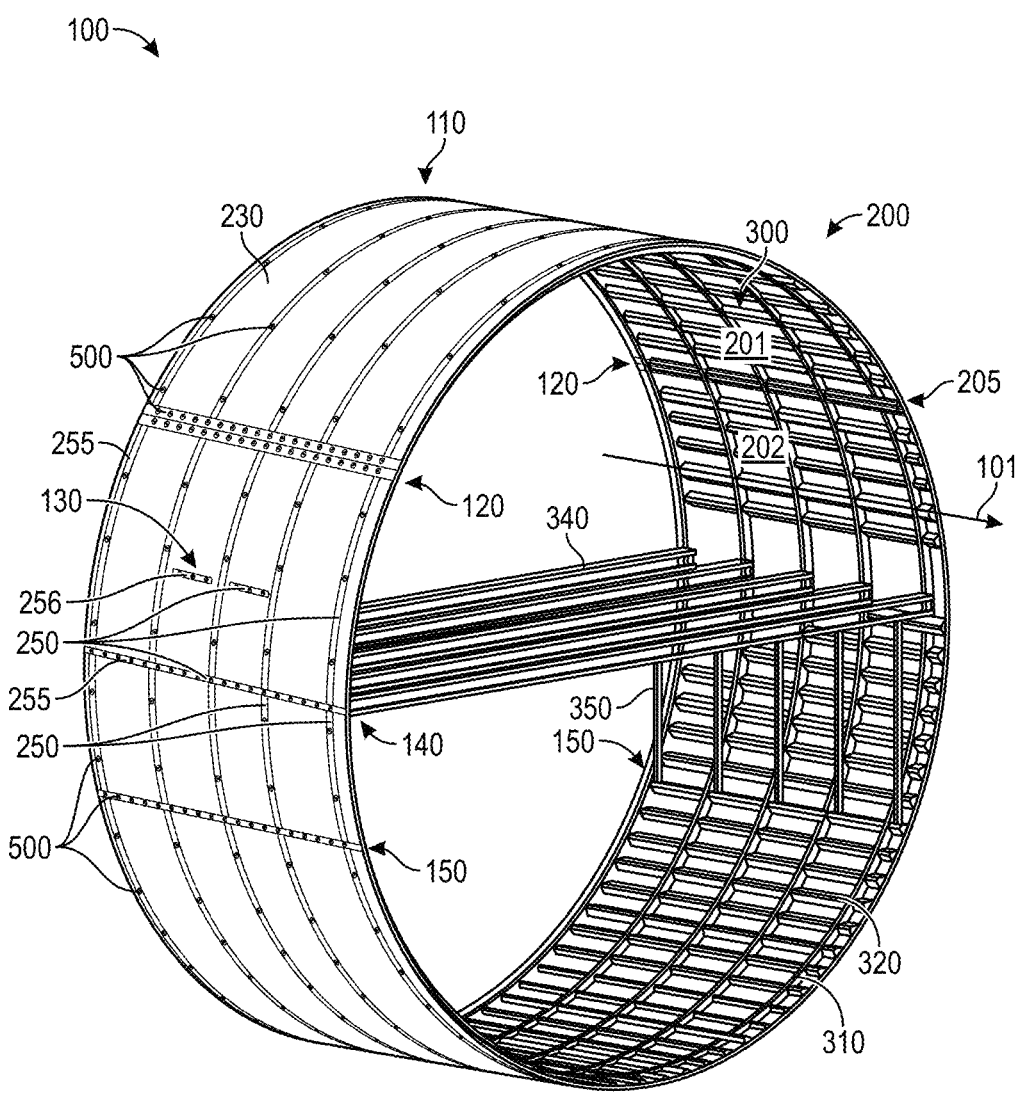
FIG. 4 illustrates a composite fuselage section according to implementations of the present disclosure.
Figure 5:
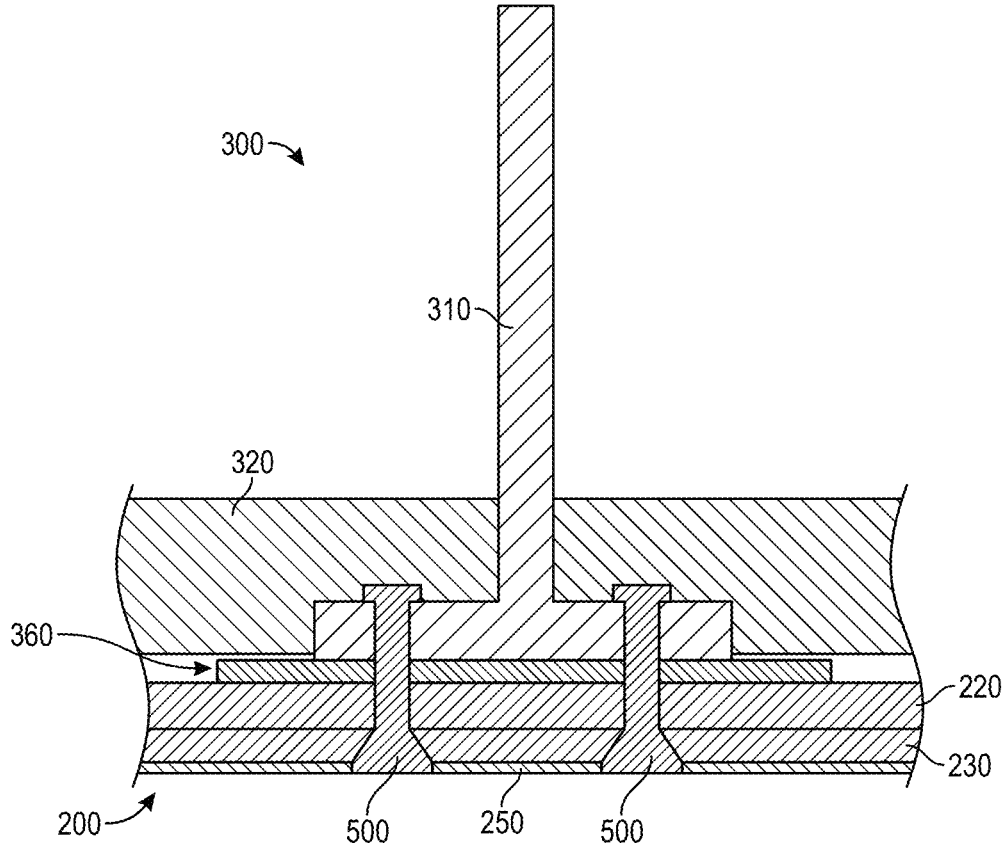
FIG. 5 illustrates a composite fuselage section according to implementations of the present disclosure.

FIG. 4 illustrates a composite fuselage section according to implementations of the present disclosure. As illustrated in FIG. 4, the internal framework 300 can also include a plurality of floor beams 340 to support a floor, such as a cabin floor, and a plurality of stanchions 350 to support the floor beams 340. The floor beams 340 and the stanchions 350 can be joined to the circumferential frames 310 or to the outer skin 200. The internal framework 300 can also include a plurality of circumferential tear straps 360 disposed between the circumferential frames 310 and the outer skin 200.

Whiles FIGS. 1 and 4 illustrate circumferential frames 310, longitudinal stringers 320, floor beams 340, stanchions 350, and circumferential tear straps 360 as part of the internal framework 300, the present disclosure is not limited thereto, and the internal framework 300 can include other structures and components. For example, the internal framework 300 can include a plurality of intercostals and fittings.

The internal framework 300 can include metal, metal alloys, and/or composite materials. For example, the circumferential frames 310 and the longitudinal stringers 320 can be made of composite materials. In other implementations, the circumferential frames 310 and the longitudinal stringers 320 comprise metal or metal alloys. In some implementations, the components of the internal framework 300 comprise a mixture of metal, metal alloys, and composite materials. In one implementation, the internal framework 300 comprises a conductive material.

Figure 2:
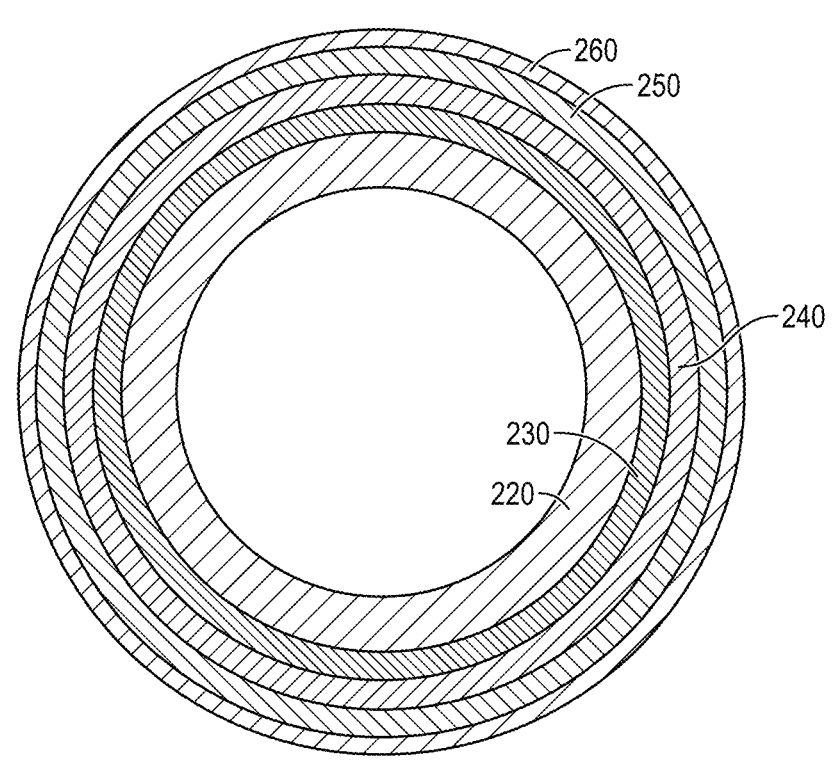
FIG. 2 illustrates an outer skin of a composite fuselage section according to implementations of the present disclosure.
Figure 3:
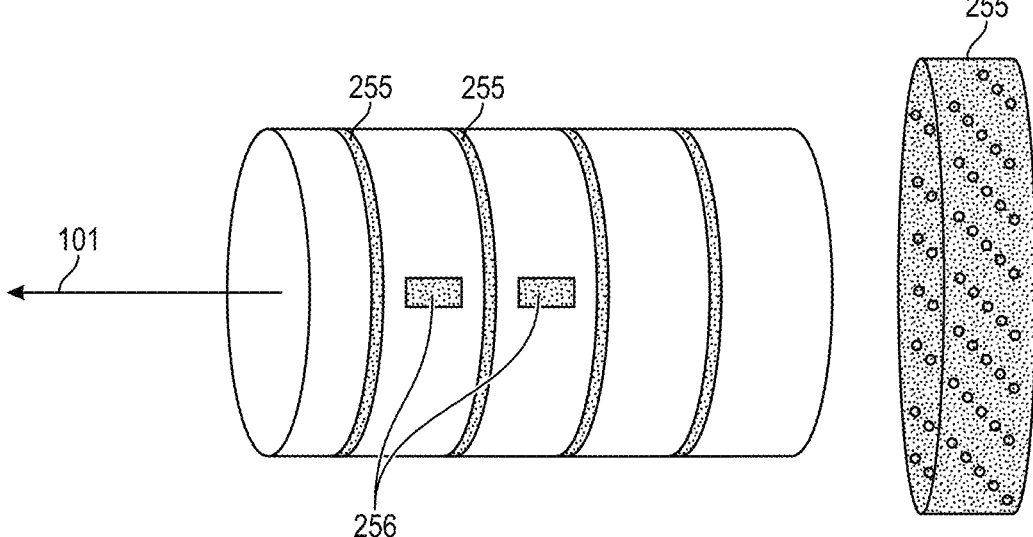
FIG. 3 illustrates an outer skin of a composite fuselage section according to implementations of the present disclosure.

FIGS. 2-3 illustrate an outer skin of a composite fuselage section according to implementations of the present disclosure. As illustrated in FIGS. 2-3, the outer skin 200 can comprise an inner layer 220, an outer layer 230, and a conductive layer 250. In some implementations, the outer skin 200 further comprises an adhesive layer 240 to bond the conductive layer 250 to the outer layer 230. In yet a further implementation, the outer skin 200 further comprises a surfacer layer 260 disposed over the outer surface of the outer skin 200.

As illustrated in FIG. 2, the inner layer 220 defines an inner surface of the outer skin 200. The inner layer 220 can comprise a composite material. For example, the inner layer 220 can comprise one or more laminated plies of a fiber reinforced resin, such as a combination of epoxy resin and carbon fiber. In some implementations, the inner layer 220 comprises one or more layers of a carbon fiber reinforced thermoset or thermoplastic. In some implementations, the inner layer 220 does not include conductive elements, and the inner layer 220 can help isolate the dispersion of lightning strike energy to the outer layer 230 and/or the outer skin 200. In other implementations, the exclusion of conductive elements in the inner layer 220 helps reduce a total weight of the outer skin 200. For example, the inner layer 220 may exclude inter woven wire fabric (IWWF) layers comprising carbon fibers. In some implementations, the inner layer 220 constitutes the inner mold line for the outer skin 200.

The outer layer 230 can be disposed over the inner layer 220. The outer layer 230 can comprise a composite material. For example, the outer layer 230 can comprise one or more laminated plies of a fiber reinforced resin, such as a combination of epoxy resin and carbon fiber. In some implementations, the outer layer 230 comprises one or more layers of a carbon fiber reinforced thermoset or thermoplastic. The outer layer 230 can constitute the outer mold line for the outer skin 200 The outer layer 230 can be conductive. In some implementations, the outer layer 230 includes one or more conductive elements or layers. For example, the outer layer 230 can comprise an inter woven wire fabric (IWWF) layer comprising carbon fibers.

In some implementations, the outer layer 230 comprises an IWWF layer, and the carbon fibers of the IWWF layer are in direct physical contact with the conductive layer 250. For example, in some implementations, the outer layer 230 and the conductive layer 250 are co-cured during a manufacturing process to ensure that at least some of the carbon fibers in the IWWF layer are in direct physical contact with the conductive layer 250. In one implementation, at least some of the carbon fibers in the outer layer 230 are in direct physical contact with the conductive layer 250.

Accordingly, in some implementations, the outer skin 200 can include the inner layer 220 defining the inner surface of the outer skin 200, the outer layer 230 disposed over the inner layer 220, and the conductive layer 250 disposed over the outer layer 230. The outer layer 230 can be conductive and the outer layer 230 can be electrically connected to the conductive layer 250.

The conductive layer 250 can be configured to improve an EME protection of the composite fuselage section 100. For example, the conductive layer 250 can be configured to reduce an energy density of a lightning strike flowing across the composite fuselage section 100 and/or the outer skin 200. The conductive layer 250 is disposed over the outer layer 230. In some implementations, the conductive layer 250 is disposed only over a portion of the outer layer 230. For example, as described below, the conductive layer 250 can be disposed over the outer layer 230 in areas corresponding to the one or more mechanical fasteners 500. The conductive layer 250 can be disposed only in areas of the outer layer 230 corresponding to the one or more mechanical fasteners 500. The conductive layer 250 can be electrically connected to the outer layer 230. The conductive layer 250 and the outer layer 230 can define one or more conductive pathways to reduce an energy density of a lightning strike flowing across the composite fuselage section 100 and/or the outer skin 200.

Accordingly, in one implementation, a composite fuselage section 100, can include an outer skin 200 comprising one or more composite materials, an internal framework 300 to support the outer skin 200, and one or more mechanical fasteners 500 disposed through the outer skin 200. The internal framework 300 can be joined to the outer skin 200 using the one or more mechanical fasteners 500, and the outer skin 200 can include a conductive layer 250 surrounding at least one of the one or more mechanical fasteners 500 to enhance an energy distribution of a lightning strike flowing across a surface of the composite fuselage section 100.

In some implementations, the conductive layer 250 defines one or more electrically conductive pathways with the outer layer 230, and the conductive layer 250 reduces an energy density of a lightning strike flowing across the composite fuselage section 100. For example, the conductive layer 250 can help disperse the energy of a lightning strike along the outer layer 230 or an outer portion of the outer skin 200.

To limit the weight added to the aircraft fuselage by the conductive layer 250, the conductive layer 250 is not a continuous layer covering an entire exterior surface of the outer layer 230. Instead, the conductive layer 250 comprises one or more bands or segments disposed over the outer layer 230.

For example, as illustrated in FIG. 3, the conductive layer 250 can comprise one or more conductive bands 255 disposed over the outer layer 230. The one or more conductive bands 255 can comprise a perforated metal foil, such as a perforated copper foil. The one or more conductive bands 255 can be disposed circumferentially around the outer skin 200. In some implementations, the one or more conductive bands 255 are substantially continuous, defining a circumferential electrical path around the outer skin 200. In one implementation, the conductive layer 250 comprises one or more conductive bands 255 disposed over the outer layer 230, wherein at least one of the one or more conductive bands 255 defines a circumferential electrical path around the outer skin 200.

In other implementations, the one or more conductive bands 255 can be interrupted to accommodate features in the outer skin 200, such as window cutouts 210 or door areas. In yet other implementations, the one or more conductive bands 255 can be disposed longitudinally along over the outer skin 200. For example, the conductive layer 250 can comprise one or more conductive bands 255 disposed over the outer layer 230, wherein at least one of the one or more conductive bands 255 defines a longitudinal electrical path along the outer skin 200.

In some implementations, the conductive layer 250 includes one or more conductive segments 256 disposed over the outer skin 200. The one or more conductive segments 256 can be non-continuous around the outer skin 200 and/or limited to a short specific area of the outer skin 200.

The conductive layer 250 can be configured to surround at least one of the one or more mechanical fasteners 500. For example, the conductive layer 250 can cover an area surrounding each of the one or more mechanical fasteners 500 disposed through the outer layer 230, either individually or a group. For example, the conductive layer 250 can cover a surface area from about 0.5 inches to about 10 inches surrounding the one or more mechanical fasteners 500. The conductive layer 250 can cover a surface area from about 3.0 inches to about 6.0 inches surrounding the one or more mechanical fasteners 500. In other implementations, the conductive layer 250 covers at least 1 inch of area surrounding the one or more mechanical fasteners 500 disposed through the outer layer 230. In other implementations, the conductive layer 250 covers at least 2 inches, at least 3 inches, at least 4 inches, or at least 5 inches of area surrounding the one or more mechanical fasteners 500 disposed through the outer layer 230.

In some implementations, all of the one or more mechanical fasteners 500 disposed through the outer layer 230 are surrounded by the conductive layer 250. In other implementations, substantially all of the one or more mechanical fasteners 500 disposed through the outer layer 230 are surrounded by the conductive layer 250.

In some implementations, only some of the one or more mechanical fasteners 500 disposed through the outer layer 230 are surrounded by the conductive layer 250. For example, to reduce weight or installation costs, substantially all of the one or more mechanical fasteners 500 in areas of the outer skin 200 and/or composite fuselage section 100 more likely to be subject to lighting strikes or requiring enhanced energy dispersion can be surrounded by the conductive layer 250, while less than substantially all of the one or more mechanical fasteners 500 in other areas may be surrounded by the conductive layer 250. For example, more of the mechanical fasteners 500 present in a forward section of an aircraft can be surrounded by the conductive layer 250 than mechanical fasteners 500 present in an aft section of an aircraft. In one implementation, more of the one or more mechanical fasteners 500 disposed through the outer layer 230 and forward of a wing section of an aircraft are surrounded by the conductive layer 250 than the one or more mechanical fasteners 500 disposed through the outer layer 230 and aft of the wing section of the aircraft.

In one implementation, the composite fuselage section 100 is configured as a forward section of an aircraft, and all of the one or more mechanical fasteners 500 disposed through the outer skin 200 are surrounded by the conductive layer 250.

The conductive layer 250 can comprise a metal or metal alloy. For example, the conductive layer 250 can comprise copper, aluminum, titanium, nickel, bronze, gold, silver, or alloys thereof. In one implementation, the conductive layer 250 comprises copper or a copper alloy. The conductive layer 250 can comprise a single ply of conductive material, such as a metal or metal alloy, or can comprise one or more layers of conductive material.

The conductive layer 250 comprise an expanded metal foil. In some embodiments, the conductive layer 250 comprises a perforated layer, such as a conductive mesh or perforated foil. For example, the conductive layer 250 can comprise a perforated copper foil. The conductive layer 250 can be perforated to decrease an overall weight of the conductive layer 250. The size of the perforations in the conductive layer 250 can correspond to a diameter of the one or more mechanical fasteners 500. For example, the size of the perforations in the conductive layer 250 can be slightly smaller than the diameter of the one or more mechanical fasteners 500 to enhance an electrical connection between the conductive layer 250 and the one or more mechanical fasteners 500. In other implementations, the conductive layer 250 is not perforated and through-holes to accommodate the one or more mechanical fasteners 500 are made into the conductive layer 250 via drilling or during the installation of the one or more mechanical fasteners 500. In yet other implementations the size of the perforations in the conductive layer 250 are smaller than a diameter of the one or more mechanical fasteners 500, and the one or more mechanical fasteners 500 enlarge said perforations or pierce through the conductive layer 250 during installation.

The conductive layer 250 can have a thickness of from about 0.005 inches (5 mil) to about 0.020 inches (20 mil). For example, the conductive layer 250 can have an average thickness of from about 0.005 inches (5 mil) to about 0.015 inches (15 mil), from about 0.005 inches (5 mil) to about 0.010 inches (10 mil); from about 0.010 inches (10 mil) to about 0.015 inches (15 mil), or from about 0.015 inches (15 mil) to about 0.020 inches (20 mil). If greater than 20 mil, the conductive layer 250 adds too much weight to the aircraft for the EME protection benefits and is significantly more difficult to form and apply to the outer skin 200. Similarly, thicknesses less than 5 mil may be too delicate for application in industrial settings and may not provide sufficient EME protection in terms of robustness, durability, and likelihood of flash-offs during an application lifetime.

The outer skin 200 can include an adhesive layer 240. The adhesive layer 240 can be disposed between the conductive layer 250 and the outer layer 230. The adhesive layer 240 can be configured to bond the conductive layer 250 and the outer layer 230.

The adhesive layer 240 can comprise materials configured to bond metal or metallic materials and composite materials. For example, the adhesive layer 240 can comprise thermosetting materials, film adhesives, and/or structural film adhesives. The adhesive layer 240 can also comprise an epoxy film adhesive, such as AF555 from the 3M Company or MB1515 from Cytec Engineered Materials, particularly suited for use with composite materials.

The outer skin 200 can include a surfacer layer 260. The surfacer layer 260 can be disposed over the outer layer 230 and the conductive layer 250. The surfacer layer 260 can cover substantially all of an exterior surface of the outer skin 200 and/or the composite fuselage section 100.

The surfacer layer 260 can comprise a coating or surface for the priming and painting of an exterior surface of the outer skin 200 and/or the composite fuselage section 100.

The surfacer layer 260 can provide a layer that can be sanded during the finishing of the composite fuselage section 100 to feather or smooth the outer layer 230 and the conductive layer 250, or the surfacer layer 260 can be configured to receive further finishing layers, such as pin hole fillers, primers, and paint topcoats. In some implementations, the surfacer layer 260 can be configured to act as an outer protection coating. For example, the surfacer layer 260 can be configured to protect the outer skin 200 from ultraviolet radiation, scuffs and small impacts, liquid penetration, and the like.

In other implementations, the surfacer layer 260 can provide a non-porous and/or nearly impervious exterior surface for the composite fuselage section 100. For example, the surfacer layer 260 can comprise an epoxy-based co-curing agent, such as Cytec's Surface Master® 905. However, in some implementations, the surfacer layer 260 is selected to be compatible with the conductive layer 250. For example, the surfacer layer 260 is selected to avoid corrosion or interaction with the conductive layer 250.

FIGS. 4-5 illustrate a composite fuselage section according to implementations of the present disclosure. In particular, FIGS. 4-5 illustrate a position of the conductive layer 250 with respect to the internal framework 300.

As illustrated in FIGS. 4-5, the internal framework 300 can include a plurality of circumferential frames 310 and a plurality of longitudinal stringers 320. The circumferential frames 310 can be spaced apart along the longitudinal axis 101 at a predetermined distance to support the outer skin 200. The longitudinal stringers 320 can be spaced apart along an internal circumference of the outer skin 200 to support and provide rigidity to the composite fuselage section 100. The internal framework 300 can also include a plurality of floor beams 340 to support a floor, such as a cabin floor, and a plurality of stanchions 350 to support the floor beams 340. In some implementations, the internal framework 300 can also include a plurality of circumferential tear straps 360 disposed between the circumferential frames 310 and the outer skin 200. For example, as illustrated in FIG. 5, a tear strap 360 can be disposed over the inner layer 220. In other implementations, the inner layer 220 includes one or more laminated plies of a fiber reinforced resin, and the tear strap 360 is interleafed with the inner layer 220.

In one implementation, the internal framework 300 can include at least one of a plurality of circumferential frames 310 and a plurality of longitudinal stringers 320 attached to the outer skin 200 using the one or more mechanical fasteners 500, and the conductive layer 250 can be disposed to surround the one or more mechanical fasteners 500 joining the at least one of the plurality of circumferential frames 310 and the plurality of longitudinal stringers 320 to the outer skin 200.

As illustrated in FIG. 5, the internal framework 300 can be joined to the outer skin 200 using one or more mechanical fasteners 500. The one or more mechanical fasteners 500 can include bolts, rivets, one-sided and two-sided lockbolts, screws, hex drive bolts, blind fasteners, and the like.

In some implementations, the one or more mechanical fasteners 500 comprise a conductive material. For example, the one or more mechanical fasteners 500 can comprise a metal or metal alloy, such as titanium, corrosion-resistant steel, Inconel, and alloys or combinations thereof.

The one or more mechanical fasteners 500 can be disposed through the outer skin 200. For example, the one or more mechanical fasteners 500 can be disposed through the inner layer 220, the outer layer 230, and the conductive layer 250.

The outer layer 230 can include an IWWF layer, and the one or more mechanical fasteners 500 can be counter-sunk through the outer skin 200 to enhance an electrical connection of the one or more mechanical fasteners 500 to the IWWF layer of the outer layer 230.

When combined with the conductive layer 250, the one or more mechanical fasteners 500 can improve an electrician energy dispersion along a surface of the composite fuselage section 100. For example, when lightning strikes an aircraft fuselage joined by one or more mechanical fasteners 500, a significant portion of the current may concentrate around or through the one or more mechanical fasteners 500. While not bound to any particular theory, it is believed that differences in the conductive properties between the materials joined by the one or more mechanical fasteners 500 may produce heat or sparking that must be mitigated. Accordingly, the dispersion of lightning currents traveling through structural joints via the one or more mechanical fasteners 500 fasteners can be enhanced by a conductive layer 250 in contact with and surrounding the one or more mechanical fasteners 500 providing an enhanced pathway for current mobility.

As illustrated in FIGS. 4-5, the conductive layer 250 can be disposed to surround the one or more mechanical fasteners 500. The conductive layer 250 can be disposed in areas where one or more mechanical fasteners 500 go through the outer skin 200. In some implementations, the conductive layer 250 is disposed to surround substantially all areas where one or more mechanical fasteners 500 go through the outer skin 200. The conductive layer 250 can be implemented as one or more conductive bands 255 and/or one or more conductive segments 256.

For example, as illustrated in FIG. 4, one or more conductive bands 255 can be disposed to surround the one or more mechanical fasteners 500 joining the plurality of circumferential frames 310 and the outer skin 200 at location 110. In other implementations, one or more conductive bands 255 can be disposed longitudinally to correspond to the one or more mechanical fasteners 500 joining the plurality of floor beams 340 and the outer skin 200 at location 140, and one or more conductive bands 255 can be disposed to surround the one or more mechanical fasteners 500 joining the plurality of stanchions 350 and the outer skin 200 at location 150.

In some implementations, one or more conductive segments 256 can be disposed to surround the one or more mechanical fasteners 500 joining intercostals and/or fittings and the outer skin 200 at location 130.

In some implementations, the outer skin 200 can include one or more components, and the one or more components of the outer skin 200 can be joined together using one or more mechanical fasteners. The conductive layer 250 can be disposed to surround the one or more mechanical fasteners joining the one or more components of the outer skin 200. For example, the outer skin 200 can include two half-barrel outer skins 201 and 202, or a plurality of fuselage sections. As illustrated in FIG. 4, an upper outer skin 201 can be joined to a lower outer skin 202 along a longitudinal splice 205 to form the composite fuselage section 100. One or more conductive bands 255 can be disposed to surround the one or more mechanical fasteners 500 joining the upper outer skin 201 and the lower outer skin 202 along the longitudinal splice 205 at location 120. While FIG. 4 illustrates a composite fuselage section 100 formed of an upper outer skin 201 and a lower outer skin 202, the present disclosure is not limited thereto, and the composite fuselage section 100 can be formed of a plurality of half-barrels, quarter-barrels, or panelized fuselage sections joined together by one or more mechanical fasteners 500.

The conductive layer 250 can be disposed to surround the one or more mechanical fasteners 500. For example, the conductive layer 250 can be disposed such that the one or more mechanical fasteners 500 are centered on the conductive layer 250 as they go through the conductive layer 250. In some implementations, each of the one or more conductive bands 255 and/or the one or more conductive segments 256 comprises a single row of mechanical fasteners 500 aligned along a center line of the one or more conductive bands 255 and/or the one or more conductive segments 256. In other implementations, each of the one or more conductive bands 255 and/or the one or more conductive segments 256 can comprise one or more rows of mechanical fasteners 500 aligned along a center line of the one or more conductive bands 255 and/or the one or more conductive segments 256. For example, as illustrated in FIG. 4, the conductive layer 250 is disposed to cover a double row of mechanical fasteners 500. Accordingly, as described above, the conductive layer 250 can be disposed to cover an area from about 0.5 inches to about 10 inches surrounding the one or more mechanical fasteners 500.

In some implementations, the internal framework 300 include a plurality of circumferential tear straps 360 disposed between the circumferential frames 310 and the outer skin 200, and at least some of the one or more mechanical fasteners joining the internal framework 300 to the outer skin 200 pass through the plurality of circumferential tear straps 360. As illustrated in FIGS. 4-5, the conductive layer 250 can include one or more conductive bands 255 positioned to correspond to the circumferential tear straps 360, and the one or more conductive bands 255 can have a width corresponding to the circumferential tear straps 360.

The conductive layer 250 can be disposed to surround all areas where the one or more mechanical fasteners 500 are present, whether they are used to join components of the internal framework 300 to the outer skin 200, whether they are used to join components of the outer skin 200 together, or whether they are used to join one two or more composite fuselage sections 100. In some implementations, the conductive layer 250 is disposed to surround all areas where the one or more mechanical fasteners 500 are disposed on the outer skin 200.

Figure 6:
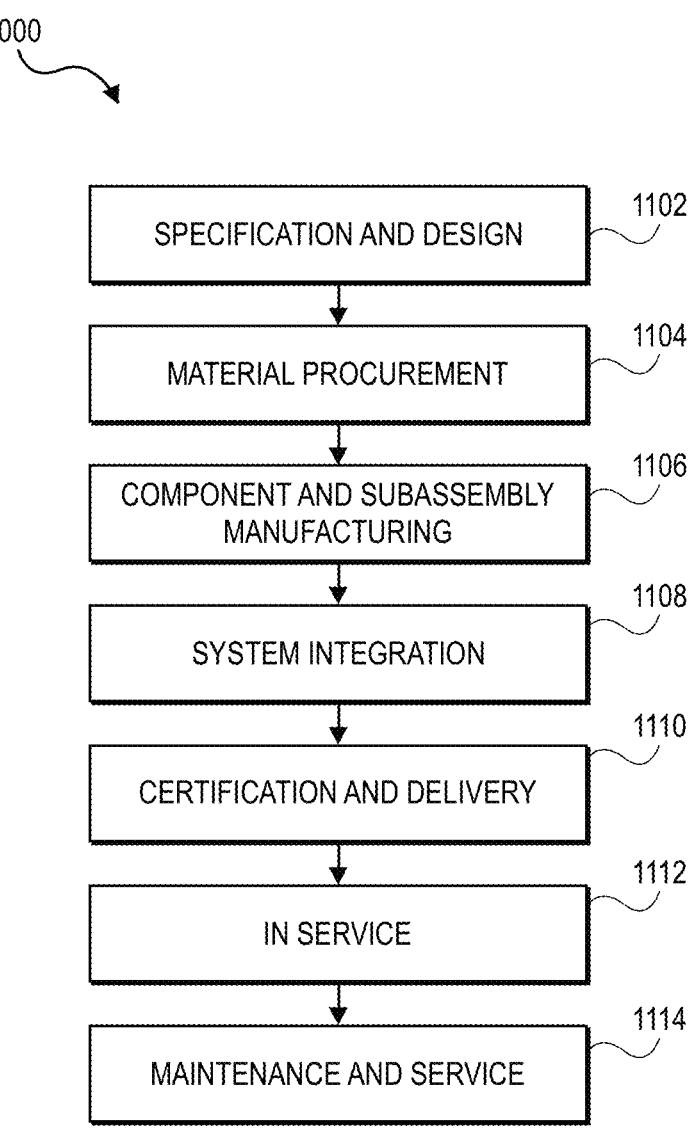
FIG. 6 illustrates a flow diagram of aircraft production and service methodology.
Figure 7:
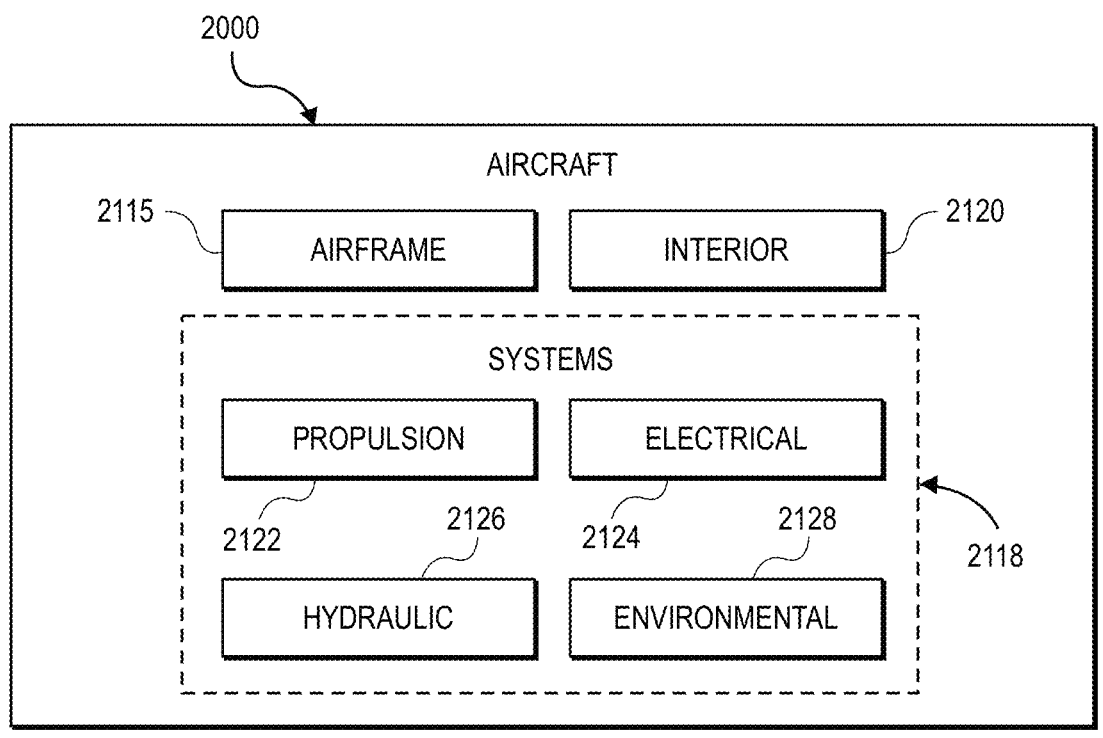
FIG. 7 illustrates a block diagram of an aircraft.

Implementations of the present disclosure may find use in a variety of potential applications, particularly in the transportation industry, including for example, aerospace, marine, rail, automotive applications, and other application where composite fuselage sections or composite barrel assemblies with improved electromagnetic effects (EME) protection are desired. However, the present disclosure is not limited thereto, and implementations of the present disclosure may be used in applications outside the transportation industry. Thus, referring now to FIGS. 6 and 7, implementations of the disclosure may be used in the context of an aircraft manufacturing and service method 1000 as shown in FIG. 6 and an aircraft 2000 as shown in FIG. 7. While FIG. 7 is described in terms of an aircraft 2000, the present disclosure is not limited thereto, and the service method 1000 can be applied to other structures. During pre-production, exemplary method 1000 may include specification and design 1102 of the aircraft 2000 and material procurement 1104. During production, component, and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 2000 produced by exemplary method 1000 may include an airframe 2115 with a plurality of systems 2118 and an interior 2120. Examples of systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods exemplified herein may be employed during any one or more of the stages of the aircraft manufacturing and service method 1000. For example, components or subassemblies corresponding to component and subassembly manufacturing 1106 may be fabricated or manufactured in a manner similar to components or subassemblies produced while the aircraft 2000 is in service. Also, one or more apparatus examples, method examples, or a combination thereof may be utilized during the component and subassembly manufacturing 1106 and system integration 1108, for example, by substantially expediting assembly of or reducing the cost of an aircraft 2000. Similarly, one or more of apparatus examples, method examples, or a combination thereof may be utilized while the aircraft 2000 is in service, for example and without limitation, to maintenance and service 1114.

While FIGS. 6 and 7 describe the disclosure with respect to aircraft and aircraft manufacturing and servicing, the present disclosure is not limited thereto. The systems and methods of the present disclosure may also be used for spacecraft, satellites, rotorcraft, submarines, surface ships, automobiles, autonomous vehicles, tanks, trucks, power plants, railway cars, and any other suitable type of objects.

The present disclosure has been described with reference to exemplary implementations. Although a few implementations have been shown and described, it will be appreciated by those skilled in the art that changes may be made in these implementations without departing from the principles and spirit of preceding detailed description. It is intended that the present disclosure be construed as including all such modifications and alterations insofar as they come within the scope of the appended claims or the equivalents thereof.

What is claimed, is:

1. A composite fuselage section, comprising:
an outer skin comprising one or more layers of composite materials and a conductive layer,
an internal framework to support the outer skin, and
one or more mechanical fasteners disposed through the one or more layers of composite materials and the conductive layer of the outer skin,
wherein the internal framework is joined to the outer skin using the one or more mechanical fasteners, and
wherein the conductive layer surrounds at least one of the one or more mechanical fasteners to enhance an energy distribution of a lightning strike flowing across a surface of the composite fuselage section.

2. The composite fuselage section of claim 1, wherein substantially all of the one or more mechanical fasteners disposed through the outer skin are surrounded by the conductive layer.

3. The composite fuselage section of claim 1, wherein the composite fuselage section is configured as a forward section of an aircraft, and substantially all of the one or more mechanical fasteners disposed through the outer skin are surrounded by the conductive layer.

4. The composite fuselage section of claim 1, wherein the conductive layer covers an area from about 0.5 inches to about 10 inches surrounding the at least one of the one or more mechanical fasteners.

5. The composite fuselage section of claim 2, wherein the conductive layer covers an area from about 0.5 inches to about 10 inches surrounding the one or more mechanical fasteners.

6. The composite fuselage section of claim 1, wherein the outer skin comprises:
an inner layer defining an inner surface of the outer skin;
an outer layer disposed over the inner layer; and
the conductive layer disposed over the outer layer,
wherein the outer layer is conductive and the outer layer is electrically connected to the conductive layer.

7. The composite fuselage section of claim 6, wherein the one or more mechanical fasteners are disposed through the inner layer, the outer layer, and the conductive layer.

8. The composite fuselage section of claim 7, wherein the outer layer comprises an inter woven wire fabric (IWWF) layer comprising carbon fibers.

9. The composite fuselage section of claim 8, wherein at least some of the carbon fibers in the outer layer are in direct physical contact with the conductive layer.

10. The composite fuselage section of claim 8, wherein the one or more mechanical fasteners are counter-sunk through the outer layer to enhance a connection of the mechanical fasteners to the IWWF layer.

11. The composite fuselage section of claim 1, wherein the conductive layer comprises a copper or a copper alloy, and wherein the conductive layer has a thickness of from about 0.005 inches to about 0.020 inches.

12. The composite fuselage section of claim 6, wherein the outer skin comprises an adhesive layer disposed between the conductive layer and the outer layer to bond the conductive layer and the outer layer.

13. The composite fuselage section of claim 6, wherein the conductive layer comprises one or more conductive bands disposed over the outer layer, and wherein at least one of the one or more conductive bands defines a circumferential electrical path around the outer skin.

14. The composite fuselage section of claim 6, wherein the conductive layer comprises one or more conductive bands disposed over the outer layer, and wherein at least one of the one or more conductive bands defines a longitudinal electrical path along the outer skin.

15. The composite fuselage section of claim 6, wherein the conductive layer comprises one or more non-continuous conductive segments disposed over the outer layer.

16. The composite fuselage section of claim 2, wherein the internal framework comprises at least one of a plurality of circumferential frames and a plurality of longitudinal stringers attached to the outer skin using the one or more mechanical fasteners, and wherein the conductive layer is disposed to surround the one or more mechanical fasteners joining the at least one of the plurality of circumferential frames and the plurality of longitudinal stringers to the outer skin.

17. The composite fuselage section of claim 2, wherein the outer skin comprises one or more components, and wherein the one or more components of the outer skin are joined together using one or more mechanical fasteners, and wherein the conductive layer is disposed to surround the one or more mechanical fasteners joining the one or more components of the outer skin.

18. A composite fuselage section, comprising:

a composite outer skin comprising an inner layer defining an inner surface of the outer skin, an outer layer disposed over the inner layer, and a conductive layer disposed over the outer layer, an internal framework to support the composite outer skin, and one or more mechanical fasteners to join the internal framework to the composite outer skin, wherein the one or more mechanical fasteners are disposed through the inner layer, the outer layer, and the conductive layer of the composite outer skin, and wherein the conductive layer covers an area from about 0.5 inches to about 10 inches surrounding at least one of the one or more mechanical fasteners.

19. The composite fuselage section of claim 18, wherein the outer layer comprises an inter woven wire fabric (IWWF) layer, and wherein the one or more mechanical fasteners are disposed through the outer layer and the conductive layer to electrically connect the outer layer and the conductive layer to help disperse an energy of a lightning strike along an outer portion of the composite outer skin.

20. A composite fuselage section, comprising:

an outer skin comprising one or more composite materials and a conductive layer, an internal framework to support the outer skin, and one or more mechanical fasteners disposed through the outer skin, wherein the internal framework is joined to the outer skin using the one or more mechanical fasteners, and wherein the conductive layer surrounds at least one of the one or more mechanical fasteners to enhance an energy distribution of a lightning strike flowing across a surface of the composite fuselage section, and wherein the conductive layer comprises one or more conductive bands defining at least one of a circumferential electrical path around the outer skin and a longitudinal electrical path along the outer skin.

* * * * *